US012515676B2

(12) United States Patent
Agari

(10) Patent No.: US 12,515,676 B2
(45) Date of Patent: Jan. 6, 2026

(54) VEHICLE-MOUNTED DEVICE AND SYSTEM

(71) Applicant: TOYOTA JIDOSHA KABUSHIKI KAISHA, Toyota Aichi-ken (JP)

(72) Inventor: Takashi Agari, Toyota Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 209 days.

(21) Appl. No.: 18/386,279

(22) Filed: Nov. 2, 2023

(65) Prior Publication Data
US 2024/0149886 A1 May 9, 2024

(30) Foreign Application Priority Data

Nov. 4, 2022 (JP) .................. 2022-177158

(51) Int. Cl.
*B60W 40/08* (2012.01)
(52) U.S. Cl.
CPC ......... *B60W 40/08* (2013.01); *B60W 2540/01* (2020.02); *B60W 2540/21* (2020.02)
(58) Field of Classification Search
CPC ............. B60W 40/08; B60W 2540/01; B60W 2540/21; B60W 50/08; B60W 2040/089; B60W 2556/45
See application file for complete search history.

(56) References Cited

U.S. PATENT DOCUMENTS

2014/0215505 A1* 7/2014 Balasubramanian ........................ H04N 21/439 725/13
2018/0251122 A1* 9/2018 Golston ................ B60W 40/08

FOREIGN PATENT DOCUMENTS

| JP | 2008-058039 A | 3/2008 | |
| JP | 2019-133260 A | 8/2019 | |
| WO | WO-2005071665 A1 * | 8/2005 | ............. G10L 15/26 |
| WO | WO-2018070668 A1 * | 4/2018 | ............. G10L 17/22 |

OTHER PUBLICATIONS

WO 2018/070668 (Year: 2018).*

* cited by examiner

*Primary Examiner* — Kito R Robinson
*Assistant Examiner* — Roy Rhee
(74) *Attorney, Agent, or Firm* — Dinsmore & Shohl LLP

(57) ABSTRACT

A vehicle-mounted device for providing multimedia information to an occupant in a vehicle transmits, to a server device, an operation log of the vehicle-mounted device for a predetermined period of time including a time point of acquisition of a voice uttered by the occupant during operation of the vehicle-mounted device by the occupant, in a case where a first voice expressing discomfort of the occupant is included in the voice.

7 Claims, 6 Drawing Sheets

VEHICLE-MOUNTED DEVICE AND SYSTEM

CROSS REFERENCE TO THE RELATED APPLICATION

This application claims the benefit of Japanese Patent Application No. 2022-177158, filed on Nov. 4, 2022, which is hereby incorporated by reference herein in its entirety.

BACKGROUND

Technical Field

The present disclosure relates to a vehicle-mounted device and a system that provide multimedia information to an occupant in a vehicle.

Description of the Related Art

Patent Literature 1 discloses a vehicle display system. The vehicle display system described in Patent Literature 1 includes a display and a multimedia information acquisition unit. The display is provided in a vehicle in a manner visible to a driver of the vehicle. The multimedia information acquisition unit acquires multimedia information. The multimedia information is information in the form of text or image. The multimedia information is displayed on the display in a manner overlapping another vehicle included in information indicating external environment of the vehicle.

CITATION LIST

Patent Literature

Patent Literature 1: Japanese Patent Laid-Open No. 2019-133260

SUMMARY

The present disclosure is aimed at providing a technique for collecting, at a desirable timing, information about operability of a vehicle-mounted device that provides multimedia information to an occupant in a vehicle.

A vehicle-mounted device according to a first mode of the present disclosure is
 a vehicle-mounted device for providing multimedia information to an occupant in a vehicle, where the vehicle-mounted device may include
 a controller configured to transmit, to a server device, an operation log of the vehicle-mounted device for a predetermined period of time including a time point of acquisition of a voice uttered by the occupant during operation of the vehicle-mounted device by the occupant, in a case where a first voice expressing discomfort of the occupant is included in the voice.

A system according to a second mode of the present disclosure is
 a system including a vehicle-mounted device that provides multimedia information to an occupant in a vehicle, and a server device that communicates with the vehicle-mounted device via a network, where
 the vehicle-mounted device may transmit, to the server device, an operation log of the vehicle-mounted device for a predetermined period of time including a time point of acquisition of a voice uttered by the occupant during operation of the vehicle-mounted device by the occupant, in a case where a first voice expressing discomfort of the occupant is included in the voice.

Another mode of the present disclosure may be a method performed by the vehicle-mounted device described above, a program for causing a computer to perform the method, or a non-transitory storage medium storing the program.

According to the present disclosure, information about operability of a vehicle-mounted device that provides multimedia information to an occupant in a vehicle may be collected at a desirable timing.

DESCRIPTION OF THE EMBODIMENTS

Figure 1:
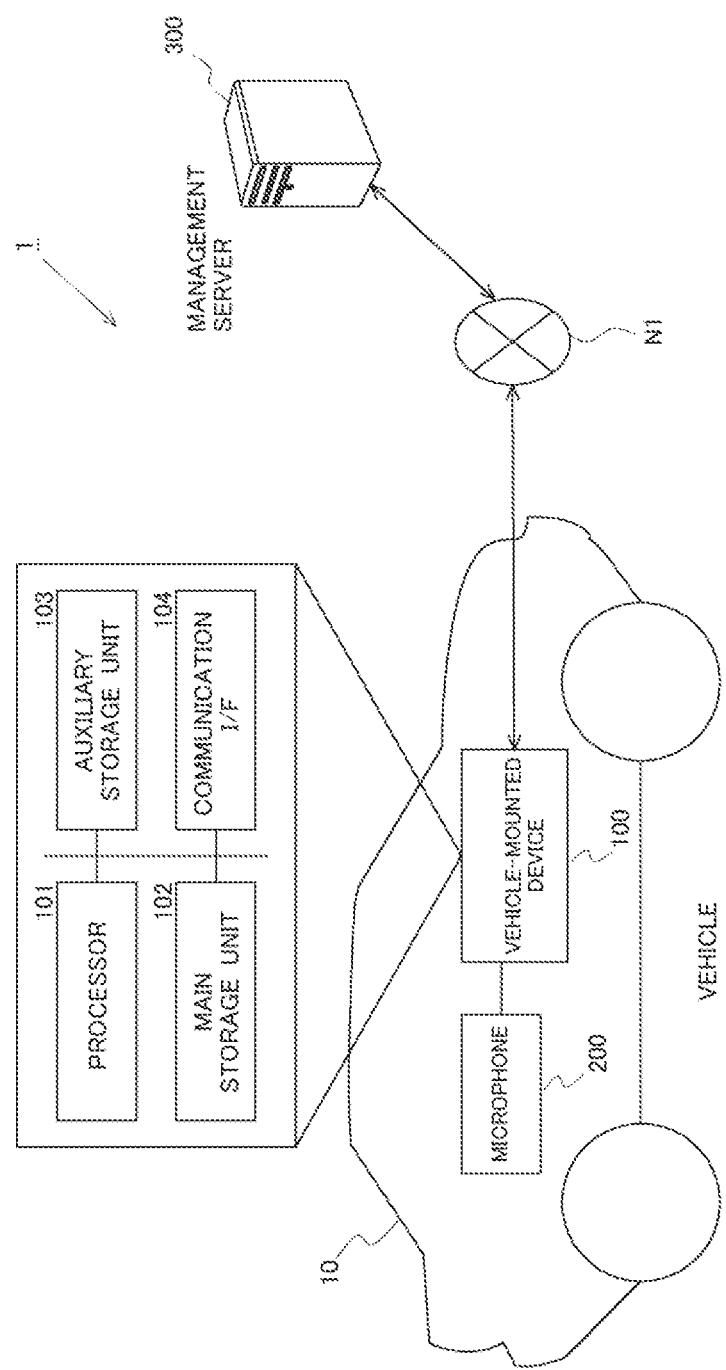
FIG. 1 is a diagram illustrating a schematic configuration of an information management system according to an embodiment.

A vehicle-mounted device according to a first mode of the present disclosure provides multimedia information to an occupant in a vehicle. The multimedia information may be information including map information, information about a route to a destination, information about a state of the vehicle, information about surrounding situation of the vehicle, traffic information, news, a social networking service (SNS), an email, an advertisement, or entertainment information (music, television, radio, movie, or the like), for example. The multimedia information may be provided inside the vehicle where the vehicle-mounted device is mounted, in the form of an image (a still image or a moving image), text, or audio.

The vehicle-mounted device is a device that is operated by an occupant in the vehicle. Operation of the vehicle-mounted device by the occupant may be performed via a touch panel display or a hardware button, for example. Furthermore, operation of the vehicle-mounted device by the occupant may be pertained through a voice uttered by the occupant. The vehicle-mounted device is capable of communicating with a server device via a network. The server device is a device that is installed outside the vehicle where the vehicle-mounted device is mounted.

The vehicle-mounted device includes a controller. In a case where a voice uttered by the occupant in the vehicle while the occupant is operating the vehicle-mounted device includes a first voice, the controller may transmit an operation log of the vehicle-mounted device for a predetermined period of time to the server device. The first voice here may be a voice expressing discomfort of the occupant. Moreover, the predetermined period of time may be a period of time including a time point of acquisition of the voice including the first voice.

When the occupant in the vehicle is operating the vehicle-mounted device, if an intended operation is difficult to perform or how to pertain the operation is difficult to understand, for example, the occupant may feel discomfort operating the vehicle-mounted device. Furthermore, in the case where the occupant feels discomfort operating the vehicle-mounted device, the occupant may utter the first voice. The vehicle-mounted device acquires a voice including the first voice uttered at such a time.

In the case where the cause that made the occupant in the vehicle utter the first voice expressing discomfort lies in the operation of the vehicle-mounted device, the operation log for the predetermined period of time highly likely includes a log of the operation of the vehicle-mounted device that made the occupant feel discomfort. Accordingly, analyzing the operation log transmitted from the vehicle-mounted device to the server device allows the operation of the vehicle-mounted device that made the occupant feel discomfort to be identified.

According to the present disclosure, in the case where the occupant in the vehicle feels discomfort operating the vehicle-mounted device, a log of such an operation may be collected in real-time at the server device. Moreover, a log that is not related to the operation of the vehicle-mounted device that made the occupant feel discomfort may be prevented from being collected.

Hereinafter, specific embodiments of the present disclosure will be described with reference to the drawings. Dimensions, materials, shapes, relative positions, and the like of structural components described in the present embodiments are not intended to limit the technical scope of the present disclosure unless stated otherwise.

First Embodiment

System Configuration

FIG. 1 is a diagram illustrating a schematic configuration of an information management system according to a present embodiment. An information management system 1 is a system that collects information about operability of a vehicle-mounted device. A vehicle-mounted device 100 is mounted on a vehicle 10. For example, the vehicle-mounted device 100 is a device that provides multimedia information to an occupant (a driver or a passenger) of the vehicle 10.

In the information management system 1, the vehicle-mounted device 100 is connected to a management server 300 via a network N1. As the network N1, a wide area network (WAN), which is a worldwide public communication network such as the Internet, or a mobile communication network for mobile phones may be adopted, for example.

The vehicle-mounted device 100 includes a computer. The computer forming the vehicle-mounted device 100 includes a processor 101, a main storage unit 102, an auxiliary storage unit 103, and a communication interface (communication I/F) 104.

The processor 101 here is a central processing unit (CPU) or a digital signal processor (DSP), for example. The main storage unit 102 is a random access memory (RAM), for example. The auxiliary storage unit 103 is a read only memory (ROM), a hard disk drive (HDD), or a flash memory, for example. The auxiliary storage unit 103 may also include a removable medium (removable recording medium). The removable medium here is an USB memory, an SD card, or a disk recording medium such as a CD-ROM, a DVD disk, or a Blu-ray disc, for example.

The auxiliary storage unit 103 stores an operating system (OS), various programs, various information tables, and the like. Various processes described below are implemented by the processor 101 loading the programs stored in the auxiliary storage unit 103 into the main storage unit 102 and executing the same.

The communication I/F 104 is an interface for performing wireless communication with the management server 300 via the network N1 by a predetermined wireless communication standard. As the predetermined wireless communication standard, 3rd generation (3G), long term evolution (LTE), or 5th generation (5G) may be cited as an example. The communication I/F 104 includes a wireless communication circuit for wireless communication.

Additionally, the vehicle-mounted device 100 does not necessarily have to be implemented by a single physical configuration, and may instead include a plurality of computers that operate in conjunction with each other. Moreover, one or some or all of functions of the vehicle-mounted device 100 may be implemented by a hardware circuit such as an ASIC or an FPGA.

Figure 2:
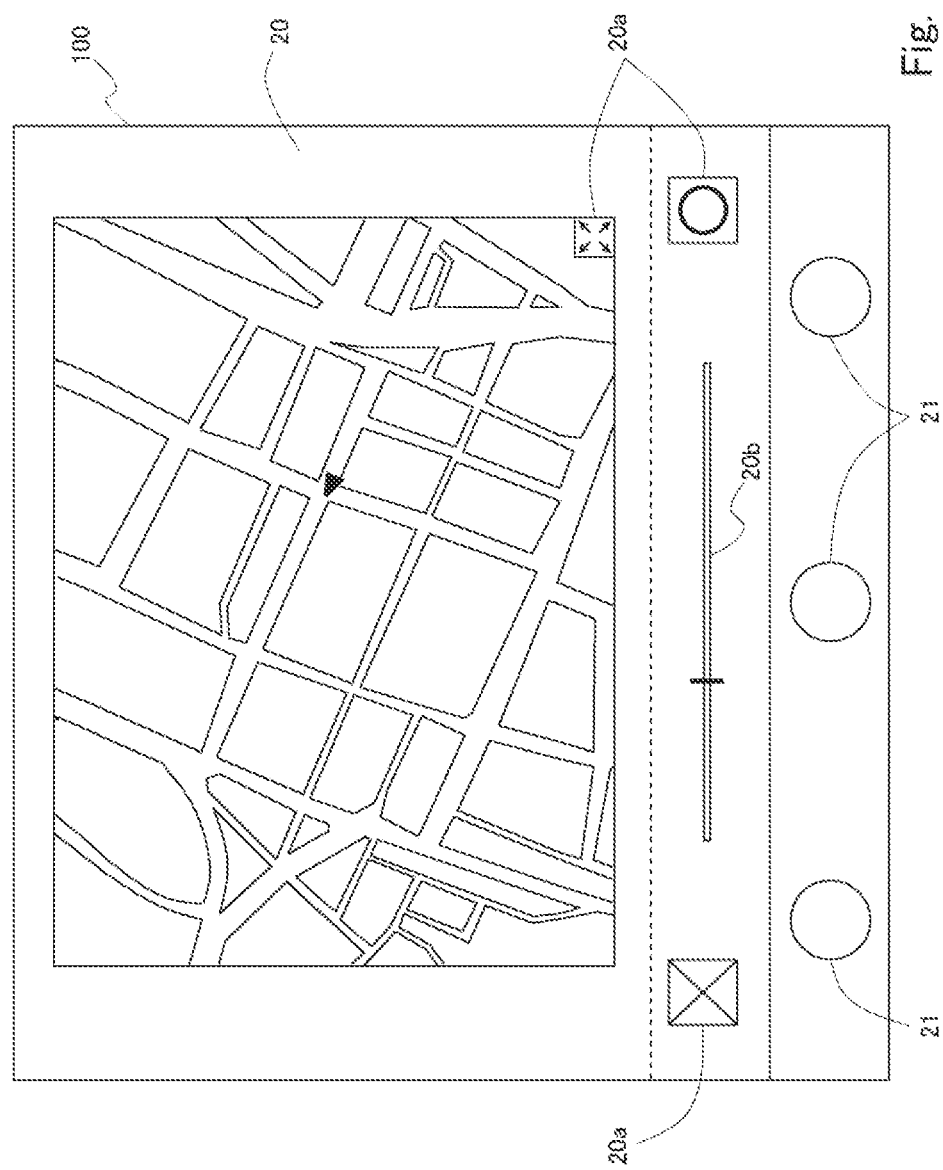
FIG. 2 is a diagram illustrating an example configuration of an operation unit, of a vehicle-mounted device, that is operated by an occupant.

Moreover, the vehicle-mounted device 100 is operated by the occupant in the vehicle 10. FIG. 2 is a diagram illustrating an example configuration of an operation unit, of the vehicle-mounted device 100, that is operated by the occupant. The vehicle-mounted device 100 includes a touch panel display 20 as the operation unit. The touch panel display 20 displays information that is to be provided to the occupant, and also, one or more buttons 20a and a lever 20b that are to be touched and operated by the occupant. Moreover, the vehicle-mounted device 100 includes, as the operation unit, one or more hardware buttons 21 in addition to the touch panel display 20. When the operation unit is operated by the occupant, the vehicle-mounted device 100 stores an operation log as log information.

Furthermore, a microphone 200 is provided inside a vehicle cabin of the vehicle 10. The microphone 200 collects voices uttered by the occupant in the vehicle 10. In the case where the occupant feels discomfort when operating the operation unit of the vehicle-mounted device 100, the occupant may possibly utter a first voice expressing discomfort of the occupant. Like other voices, the first voice uttered by the occupant at the time is also collected by the microphone 200.

Figure 3:
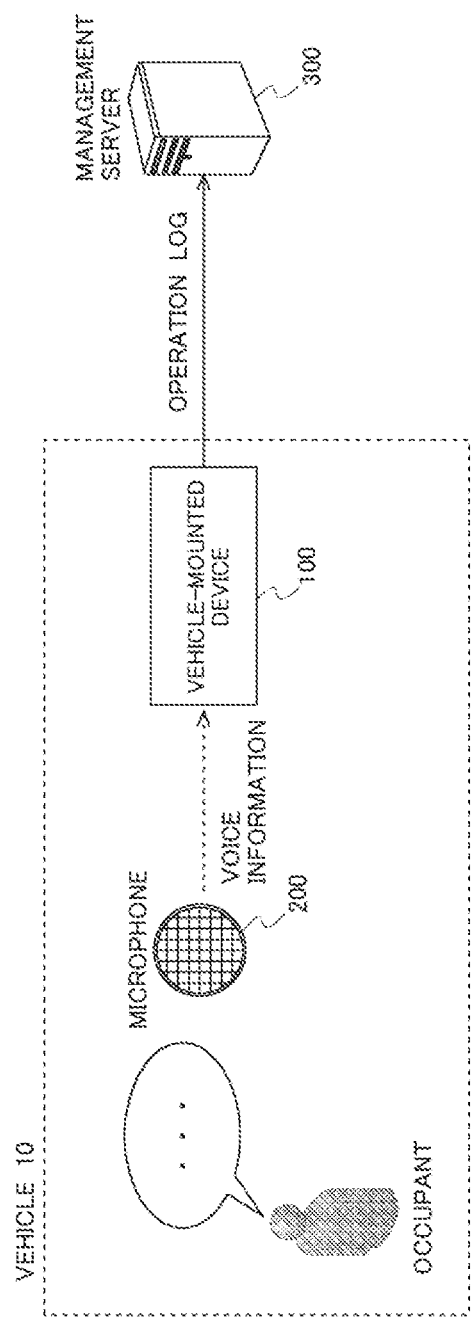
FIG. 3 is a diagram for describing a flow of information collection by the information management system.

The information management system 1 collects information about operability of the vehicle-mounted device 100 by using a voice collected by the microphone 200. FIG. 3 is a diagram for describing a flow of information collection by the information management system 1. When a voice uttered by the occupant in the vehicle 10 is collected by the microphone 200, voice intonation is transmitted from the microphone 200 to the vehicle-mounted device 100.

With the vehicle-mounted device 100, when the voice information is received from the microphone 200 while the vehicle-mounted device 100 is being operated by the occupant, whether the first voice expressing discomfort of the occupant is included in the voice information or not is determined. In the case where the first voice is included in the voice information, the vehicle-mounted device 100 transmits an operation log for a predetermined period of time including the time of reception of the voice information to the management server 300 via the network N1. Accordingly, in the case where the occupant in the vehicle 10 utters the first voice while operating the vehicle-mounted device 100, the operation log regarding the operation at the time is collected by the management server 300.

Functional Configuration

Figure 4:
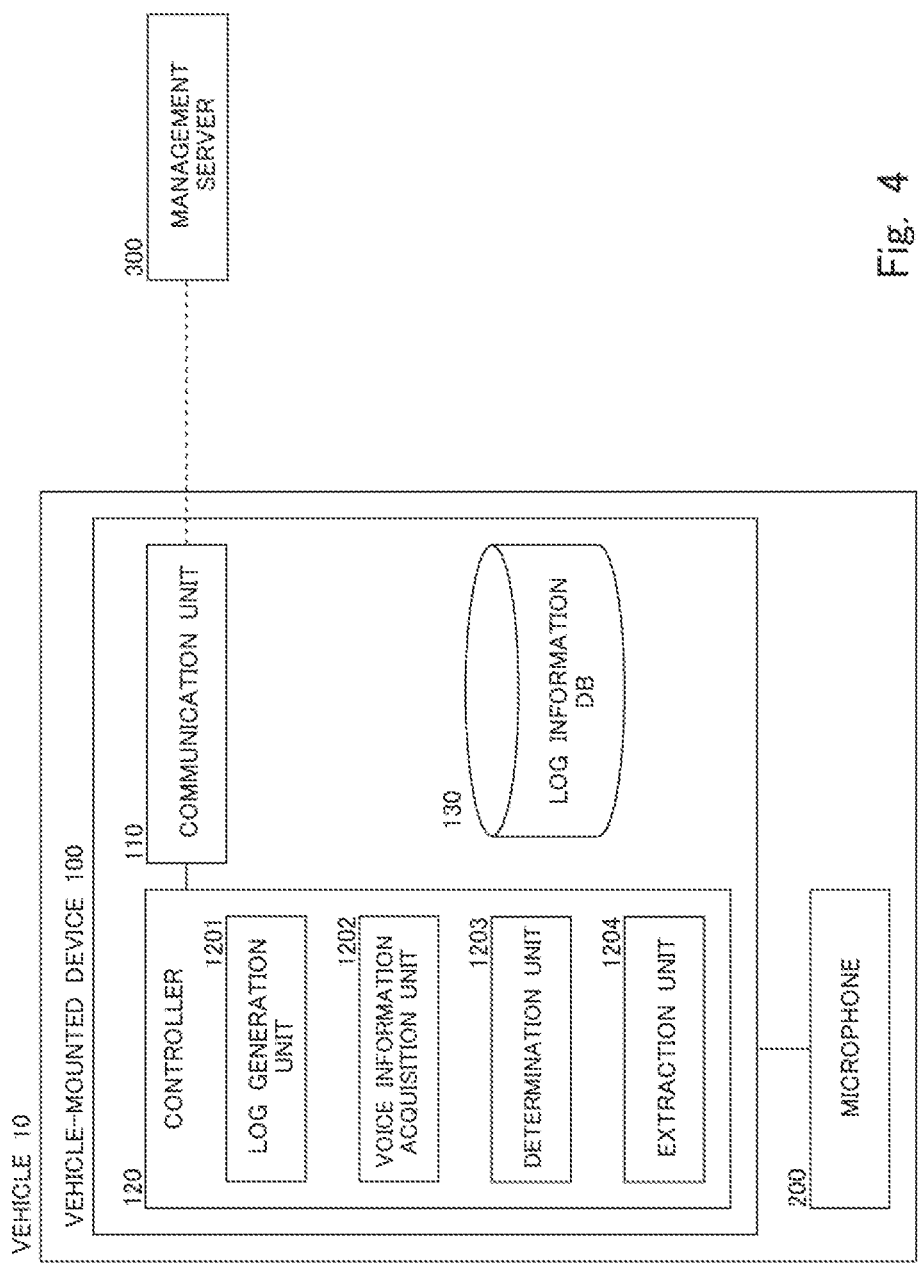
FIG. 4 is a block diagram schematically illustrating an example functional configuration of the vehicle-mounted device.

Next, a functional configuration of the vehicle-mounted device 100 will be described with reference to FIG. 4. FIG. 4 is a block diagram schematically illustrating an example functional configuration of the vehicle-mounted device 100. Additionally, in the present embodiment, the vehicle-mounted device 100 corresponds to the vehicle-mounted device according to the present disclosure.

As functional units, the vehicle-mounted device 100 includes a communication unit 110, a controller 120, and a log information database (log information DB) 130. The communication unit 110 includes a function of connecting the vehicle-mounted device 100 to the network N1. The communication unit 110 may be implemented by the communication I/F 104.

The controller 120 includes a function of performing arithmetic processing for controlling the vehicle-mounted device 100. The controller 120 can be implemented by the processor 101. As functional units, the controller 120 includes a log generation unit 1201, a voice information acquisition unit 1202, a determination unit 1203, and an extraction unit 1204.

Figures 5, 6:
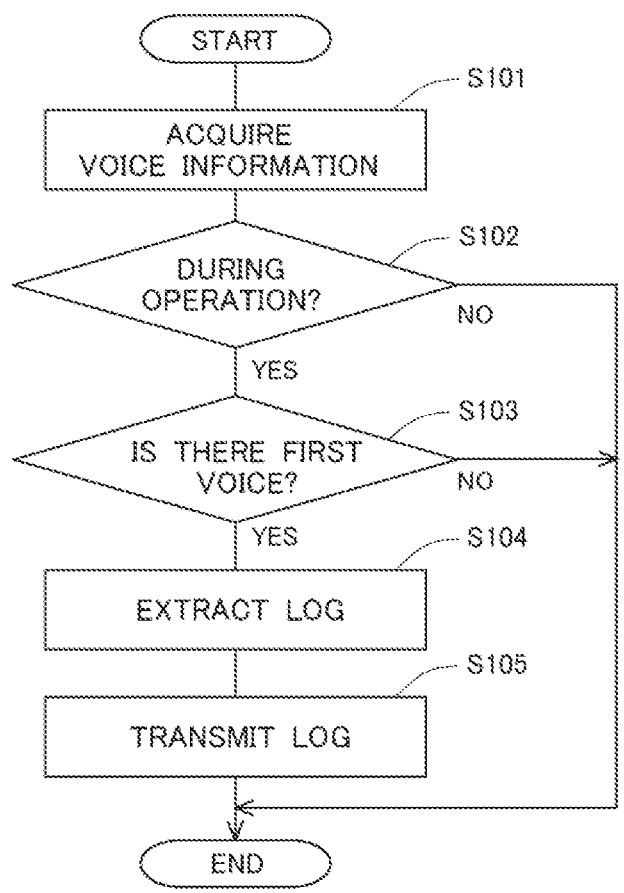
FIG. 5 is a diagram illustrating log information that is stored in a log information database.
FIG. 6 is a flowchart illustrating a flow of information processing performed by the vehicle-mounted device.

When the vehicle-mounted device 100 is operated by the occupant in the vehicle 10, the log generation unit 1201 generates an operation log. The operation log generated by the log generation unit 1201 is stored as log information in the log information DB 130. FIG. 5 is a diagram illustrating the log information (the operation log) that is stored in the log information DB 130. As illustrated in FIG. 5, the operation log that is stored in the log information DB 130 includes operation date/time and operation contents. The log information is added to the log information DB 130 every time the vehicle-mounted device 100 is operated by the occupant in the vehicle 10. Additionally, the log information DB 130 is constructed in the auxiliary storage unit 103 through execution of a program of a database management system by the processor 101.

The voice information acquisition unit 1202 acquires the voice information that is transmitted from the microphone 200. The voice information acquisition unit 1202 acquires the voice information every time the microphone 200 collects the voice that is uttered by the occupant in the vehicle 10. Then, in the case where the voice information is acquired by the voice information acquisition unit 1202 while the occupant is operating the vehicle-mounted device 100, the determination unit 1203 determines whether the first voice is included in the voice information that is acquired or not.

There are various patterns of voices that express discomfort of the occupant. The vehicle-mounted device 100 may store in the auxiliary storage unit 103 in advance voice text of a plurality of patterns corresponding to the first voice. The determination unit 1203 may determine whether the voice text, stored in advance, of one of the plurality of patterns corresponding to the first voice is included in text of the voice in the voice information that is acquired by the voice information acquisition unit 1202.

Furthermore, determination of whether the first voice is included in the voice information or not may be performed based on tone of the voice. In this case, the vehicle-mounted device 100 may store in the auxiliary storage unit 103 in advance tones of voices of the plurality of patterns corresponding to the first voice. Then, the determination unit 1203 may determine whether one of the tones of the voices of the plurality of patterns stored in advance and corresponding to the first voice is included in the voice in the voice information acquired by the voice information acquisition unit 1202.

Moreover, the determination unit 1203 may perform determination of whether the first voice is included in the voice information or not, by using a trained machine learning model generated by machine learning. In this case, the machine learning model includes at least one computation parameter for performing computation of inference processing. The value of the computation parameter of the machine learning model may be adjusted as appropriate such that inference processing of determining whether the first voice is included in given voice information or not can be performed by machine learning using learning data. Additionally, the type of machine learning model may be selected as appropriate according to the embodiment. For example, the machine learning model may be a neural network.

In the case where it is determined by the determination unit 1203 that the first voice is included in the voice information acquired by the voice information acquisition unit 1202, the extraction unit 1204 extracts, from the log information DB 130, the operation log for a predetermined period of time including the time point of acquisition of the voice information in question. The predetermined period of time here is determined in advance as a period of time when there is possibly a relation between the operation of the vehicle-mounted device 100 indicated by the operation log and the voice of the occupant indicated by the voice information.

When an operation log is extracted by the extraction unit 1204, the controller 120 performs a process of transmitting the extracted operation log to the management server 300 via the communication unit 110.

By analyzing the operation log received from the vehicle-mounted device 100, the management server 300 identifies the operation of the vehicle-mounted device 100 that made the occupant feel discomfort. In the case where the cause that made the occupant in the vehicle 10 utter the first voice lies in the operation of the vehicle-mounted device 100, the operation log for the predetermined period of time highly likely includes a log of operation of the vehicle-mounted device 100 that made the occupant feel discomfort.

Accordingly, the operation of the vehicle-mounted device 100 that made the occupant feel discomfort may be identified by analyzing the operation log received from the vehicle-mounted device 100.

Information Processing

Next, a flow of information processing that is performed by the vehicle-mounted device 100 for log information collection will be described with reference to FIG. 6. FIG. 6 is a flowchart illustrating a flow of information processing performed by the vehicle-mounted device 100. The present flow is performed by the controller 120 of the vehicle-mounted device 100.

In the present flow, first, in S101, voice information transmitted from the microphone 200 is acquired. Next, in S102, whether the vehicle-mounted device 100 is being operated by the occupant or not is determined. In the case where negative determination is made in S102, or in other words, in the case where the vehicle-mounted device 100 is not being operated, execution of the present flow is ended.

In the case positive determination is made in S102, the process in S103 is pertained next. In S103, whether the first voice is included in the voice information acquired in S101 or not is determined. In the case where negative determination is made in S103, or in other words, in the case where the first voice is not included in the voice information, execution of the present flow is ended. In this case, the operation log is not transmitted to the management server 300.

In the case where positive determination is made in S103, the process in S104 is performed next. In S104, the operation log for a predetermined period of time including the time point of acquisition of the voice information in S101 is extracted from the log information DB 130. Next, in S105, the operation log extracted in S104 is transmitted to the management server 300. Then, execution of the present flow is ended.

With the information management system 1 according to the present embodiment, in the case where the occupant in the vehicle 10 feels discomfort operating the vehicle-mounted device 100, the log of the operation can be collected in real-time in the management server 300. Furthermore, collection of a log that is not related to the operation of the vehicle-mounted device 100 that made the occupant feel discomfort may be prevented.

Additionally, in the embodiment described above, operation of the vehicle-mounted device 100 is performed using the touch panel display 20 or the hardware button 21 provided as the operation unit, but the vehicle-mounted device 100 may instead be operated by voice of the occupant. Also in this case, when the vehicle-mounted device 100 is operated by the voice uttered by the occupant, the operation log is stored in the log information DB 130.

Second Embodiment

A schematic configuration of an information management system according to a present embodiment is the same as the schematic configuration of the information management system according to the first embodiment described above. Furthermore, a functional configuration of the vehicle-mounted device according to the present embodiment is the same as the functional configuration of the vehicle-mounted device according to the first embodiment described above. However, with the vehicle-mounted device 100 in the present embodiment, in addition to the operation log, logs other than the operation log are also stored as log information in the log information DB 130.

More specifically, with the vehicle-mounted device 100, a log of a process for providing multimedia information to the occupant (hereinafter sometimes referred to as "process log") is generated by the log generation unit 1201. The process log that is generated is stored as log information in the log information DB 130. Moreover, with the vehicle-mounted device 100, a log of communication between the vehicle-mounted device 100 and another appliance (hereinafter sometimes referred to as "communication log") is generated by the log generation unit 1201. Another appliance that communicates with the vehicle-mounted device 100 may be a terminal carried by the occupant, an appliance (such as an ECU) mounted on the vehicle 10, or a communication appliance that is present outside the vehicle 10, for example. The communication log that is generated is stored as log information in the log information DB 130. Generation of the process log and the communication log by the vehicle-mounted device 100 is performed at a predetermined resolution.

Even when the occupant utters the first voice expressing discomfort while operating the vehicle-mounted device 100, the cause may possibly be other than operation of the vehicle-mounted device 100. For example, the occupant may possibly utter the first voice in a case where a process that is supposed to be performed in the vehicle-mounted device 100 to provide multimedia information to the occupant is not performed due to malfunction of the vehicle-mounted device 100. Moreover, the occupant may possibly utter the first voice in a case where communication that is supposed to be performed between the vehicle-mounted device 100 and another appliance is not performed due to malfunction of the vehicle-mounted device 100 or due to a communication failure.

Accordingly, with the vehicle-mounted device 100 according to the present embodiment, in the case where the first voice is included in the voice information that is acquired while the occupant is operating the vehicle-mounted device 100, the process log and the communication log for the predetermined period of time are extracted from the log information DB 130 in addition to the operation log for the predetermined period of time. Then, the operation log, the process log, and the communication log that are extracted are transmitted to the management server 300.

Accordingly, in a case where the occupant in the vehicle 10 feels discomfort about operation, processing, or communication of the vehicle-mounted device 100 while operating the vehicle-mounted device 100, a log indicating the cause of discomfort may be collected in real-time in the management server 300. Then, the management server 300 identifies the cause of discomfort felt by the occupant by analyzing the operation log, the process log, and the communication log received from the vehicle-mounted device 100.

However, it is sometimes not possible to identify the cause of discomfort felt by the occupant at the management server 300 even when analyzing the various logs. For example, when the cause of discomfort of the occupant is a failure of a process for providing multimedia information to the occupant or a failure of communication with another appliance, if a log indicating the failure is not stored in the log information DB 130, the cause of discomfort felt by the occupant cannot be identified even when the process log and the communication log are analyzed at the management server 300.

Accordingly, in the case where the cause of discomfort felt by the occupant is not identified even when analyzing the various logs, the management server 300 transmits, to the vehicle-mounted device 100, a command to temporarily increase a resolution for generation of the process log and the communication log by the log generation unit 1201 to more than a predetermined resolution. By increasing, at the vehicle-mounted device 100, the resolution for generation of the process log and the communication log by the log generation unit 1201, a process log or a communication log that is not detected at the predetermined resolution and that indicates a failure is possibly generated and stored in the log information DB 130. When a process log or a communication log indicating a failure is stored in the log information DB 130, the cause of discomfort felt by the occupant can be identified by analysis of the log by the management server 300.

Information Processing

Figure 7:
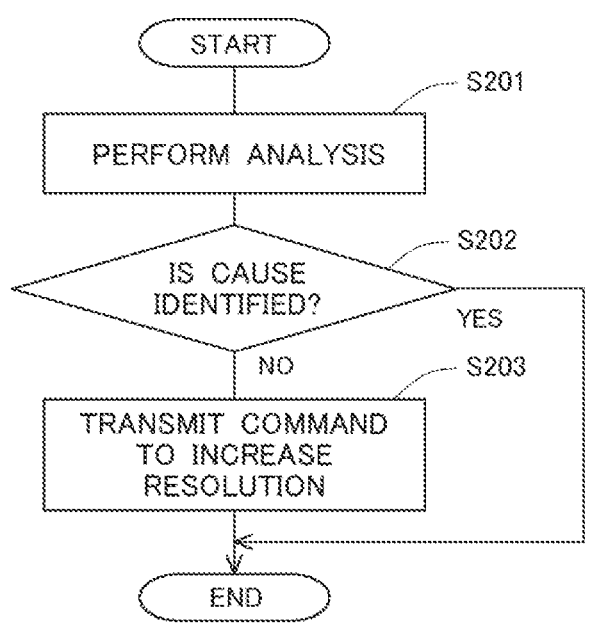
FIG. 7 is a flowchart illustrating a flow of information processing performed by a management server.

A flow of information processing that is performed at the time of log analysis by the management server 300 will be described with reference to FIG. 7. FIG. 7 is a flowchart illustrating a flow of information processing performed by the management server 300.

In the present flow, first, in S201, analysis of the various logs received from the vehicle-mounted device 100 is performed. Next, in S202, whether the cause of discomfort felt by the occupant is identified by analysis of the various logs in S201 or not is determined. In the case where positive determination is made in S202, or in other words, in the case where the cause of discomfort felt by the occupant is identified, execution of the present flow is ended.

In the case where negative determination is made in S202, the process in S203 is performed next. In S203, the command to temporarily increase the resolution for generation of the process log and the communication log to more than the predetermined resolution is transmitted to the vehicle-mounted device 100. Then, execution of the present flow is ended. When the command transmitted from the management server 300 is received, the resolution for generation of the process log and the communication log is temporarily increased to more than the predetermined resolution at the vehicle-mounted device 100. Then, the process log and the communication log generated at a resolution that is temporarily increased to more than the predetermined resolution is stored in the log information DB 130.

Additionally, in the embodiment described above, in the vehicle-mounted device 100, both the process log and the communication log are generated as the logs other than the operation log, and are stored as the log information in the log information DB 130. Moreover, both the process log and the communication log are transmitted from the vehicle-mounted device 100 to the management server 300, together with the operation log. However, the log, other than the operation log, that is generated at the vehicle-mounted device 100 and transmitted to the management server 300 may be one of the process log and the communication log.

OTHER EMBODIMENTS

The embodiments described above are merely examples, and the present disclosure may be changed and implemented as appropriate within the scope of the disclosure. Furthermore, processes and components described in the present disclosure may be freely combined to the extent that no technical conflict exists.

Furthermore, a process that is described to be performed by one apparatus may be shared and pertained by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions, such as read-only memories (ROMs), random access memories (RAMS), EPROMs, EEPROMs, magnetic cards, flash memories, or optical cards.

What is claimed is:

1. A vehicle-mounted device for providing multimedia information to an occupant in a vehicle, and a microphone positioned within the vehicle and configured to obtain a voice of the occupant, the vehicle-mounted device comprising:
   a memory configured to store an operation log of the vehicle-mounted device and text for a plurality of patterns stored in advance that correspond to a first voice uttered within the voice by the occupant obtained by the microphone, the first voice being different from the voice of the occupant wherein the first voice expresses discomfort of the occupant during operation of the vehicle-mounted device and the voice does not express discomfort of the occupant during operation of the vehicle-mounted device; and
   a controller connected to the memory, the controller is configured to:
      determine whether any of the text of the plurality of patterns is included in the voice uttered by the occupant during operation of the vehicle-mounted device by the occupant;
      generate the operation log of the vehicle-mounted device;
      when the voice corresponds to any of the text of the plurality of patterns indicating that the first voice is uttered, extract, from the memory, the operation log of the vehicle-mounted device for a predetermined period of time including a time point of acquisition of the voice uttered by the occupant during operation of the vehicle-mounted device by the occupant, the predetermined period of time is a period of time when there is a relation between the operation of the vehicle-mounted device indicated by the operation log and the voice of the occupant indicating the first voice is uttered; and
      transmit, to a server device, the extracted operation log.

2. The vehicle-mounted device according to claim 1, wherein
   the memory is further configured to store a log information for providing the multimedia information performed by the vehicle-mounted device, and
   the controller is further configured to:
   extract, from the memory, together with the operation log of the vehicle-mounted device for the predetermined period of time, the log information for providing the multimedia information performed by the vehicle-mounted device during the predetermined period of time; and
   transmit, to the server device, together with the operation log of the vehicle-mounted device for the predetermined period of time, the extracted log information.

3. The vehicle-mounted device according to claim 1, wherein
   the memory is further configured to store a log of communication between the vehicle-mounted device and another appliance performed, and
   the controller is further configured to:
   extract, from the memory, together with the operation log of the vehicle-mounted device for the predetermined period of time, the log of the communication between the vehicle-mounted device and another appliance performed during the predetermined period of time; and
   transmit, to the server device, together with the operation log of the vehicle-mounted device for the predetermined period of time, the extracted log of the communication.

4. A system comprising:
a vehicle having a microphone positioned therein and configured to obtain a voice of an occupant;
a vehicle-mounted device that provides multimedia information to the occupant in the vehicle; and
a server device that communicates with the vehicle-mounted device via a network;
wherein the vehicle-mounted device comprises:
  a controller; and
  a memory configured to store an operation log of the vehicle-mounted device and text for a plurality of patterns stored in advance that correspond to a first voice uttered within the voice by the occupant obtained by the microphone, the first voice being different from the voice of the occupant wherein the first voice expresses discomfort of the occupant during operation of the vehicle-mounted device and the voice does not express discomfort of the occupant during operation of the vehicle-mounted device, the memory connected to the controller;
wherein the controller is configured to:
  determine whether any of the text of the plurality of patterns is included in the voice uttered by the occupant during operation of the vehicle-mounted device by the occupant;
  generate the operation log of the vehicle-mounted device;
  when the voice corresponds to any of the text of the plurality of patterns indicating that the first voice is uttered, extract, from the memory, the operation log of the vehicle-mounted device for a predetermined period of time including a time point of acquisition of the voice uttered by the occupant during operation of the vehicle-mounted device by the occupant, the predetermined period of time is a period of time when there is a relation between the operation of the vehicle-mounted device indicated by the operation log and the voice of the occupant indicating the first voice is uttered; and
  transmit, to the server device, the extracted operation log.

5. The system according to claim 4, wherein
the memory is further configured to store a log information for providing the multimedia information performed by the vehicle-mounted device or a log of communication between the vehicle-mounted device and another appliance performed, and
the controller is further configured to:
  extract, from the memory, together with the operation log of the vehicle-mounted device for the predetermined period of time, the log information for providing the multimedia information performed by the vehicle-mounted device during the predetermined period of time or the log of communication between the vehicle-mounted device and another appliance performed during the predetermined period of time; and
  transmit, to the server device, together with the operation log of the vehicle-mounted device for the predetermined period of time, the extracted log information, or the extracted log of the communication.

6. The system according to claim 5, wherein the server device transmits, to the vehicle-mounted device, a command to increase a resolution of generation of the log information or the log of the communication, based on an analysis result for the log received from the vehicle-mounted device.

7. The system according to claim 6, wherein, in a case where a log that is related to discomfort of the occupant is not identified by analyzing the log received from the vehicle-mounted device, the server device transmits, to the vehicle-mounted device, the command to increase the resolution of generation of the log information or the log of the communication.

* * * * *